United States Patent Office 3,634,552
Patented Jan. 11, 1972

3,634,552
POLYMER BLEND COMPOSITIONS COMPRISING POLYPROPYLENE AND ETHYLENE/BUTENE COPOLYMER
Andrew J. Foglia, Plainfield, and Harold G. Tinger, Wayne, N.J., assignors to Mobil Oil Corporation
No Drawing. Continuation-in-part of application Ser. No. 555,012, June 3, 1966. This application Sept. 22, 1969, Ser. No. 860,026
Int. Cl. C08f 37/18
U.S. Cl. 260—897 A
5 Claims

ABSTRACT OF THE DISCLOSURE

Resinous blend compositions, particularly suitable for the preparation of oriented shrink film products, comprising a blend of from about 10% to about 90% by weight of a high isotactic content polypropylene blended with from about 10 to about 90% by weight of an ethylene-butene-1 copolymer resin containing a minor amount of ethylene.

CROSS-REFERENCES TO RELATED APPLICATIONS

The present application is a continuation-in-part application of U.S. application Ser. No. 555,012, filed June 3, 1966, entitled "Thermoplastic Polymer Blend Compositions and Heat Shrinkable Films Therefrom," now abandoned.

Ser. No. 860,088, filed on even date herewith and entitled "Heat Shrinkable Films" is directed to shrinkable film structures prepared from the novel resin blend compositions of the present application.

The present invention relates to blends of thermoplastic polymer materials and films thereof having improved properties. More particularly the present invention relates to blends of polypropylene resin with a copolymer resin, such as ethylene-butene-1 copolymer, which blends have been found useful for fabrication into thermoplastic films with improved heat-shrink properties.

Thermoplastic films are finding increasing usage as a packaging material and particularly in the area of shrink packaging wherein objects are packaged in thermoplastic shrink film and upon the application of heat the film shrinks to conform to the shape of the article packaged therein. The present invention provides a novel blend composition comprising a blend of thermoplastic resinous polymer and copolymer material and particularly blends of an olefin polymer and olefin copolymer which may be fabricated into film structures which shrink upon the application of heat.

Many thermoplastic films will shirnk to some extent if they are subjected to elevated temperatures. Use is made of this characteristic by subjecting objects packaged in such films for a short time to elevated temperatures, e.g. exposing them to a blast of heated air, or by immersion in boiling water so that the films shrink, thereby tightly enclosing the objects packaged therein. Typical of the films useful for this purpose include those fabricated from polyolefins or irradiated polyolefins. For most shrink film applications it is desired that the films exhibit a high shrink energy, or contractile force, when exposed to elevated temperatures as well as having a relatively high ratio of film area reduction after exposure to heat in order to insure a tight, skin-like closure about the article being packaged. Furthermore, it is desirable to orient or stretch such films at some stage of their production to achieve an oriented film which will exhibit such properties when exposed to elevated temperatures. Oriented films may be obtained by stretching processes in which tensions capable of stretching the film are applied to the film, the directions of which form an angle of about 90° utilizing well known prior art techniques. These film stretching tensions may be applied sequentially, as in the case where the film, after forming, is subjected to stretching in a longitudinal direction and thereafter tension is applied in a transverse direction to stretch the film transversely, or simultaneously, whereby longitudinal and transverse tensions are applied to the film at the same time resulting in a simultaneous longitudinal and transverse stretching of the film. Such processes are well known in the art and include, for example, the "double-bubble" method which comprises extrusion of a tubular base film, cooling of the tubular film, reheating and inflation of the tube and simultaneously drawing the inflated tube in a longitudinal direction thereby imparting biaxial orientation to the film. Another common method for the biaxial orientation of a film sheet comprises passing the film sheet through a series of rotating draw rollers which impart longitudinal direction stretch to the film and subsequently transversely drawing the longitudinally stretched film, for example, by passing it through a tenter frame wherein the film is stretched in a transverse direction.

However, many of the prior art oriented films produced in accord with the above processes, for example possess certain disadvantages such as low shrink energy or comparatively low shrink area reduction unless excessively high shrink temperatures are employed. Exposure to such relatively high temperatures, i.e., temperatures on the order of 212° F. and above, in order to effect film shrinkage is undesirable in many instances. In particular, in the shrink packaging of certain foods, such as meat for example, when temperatures in excess of 212° F. are employed to shrink the film around the meat, juices which are on the meat surface will have a tendency to flash or boil off leaving what is commonly referred to as a bruise on the meat. This is highly undesirable.

As hereinbefore indicated, in order for a shrinkable film to be successfully employed in food packaging applications, it is desirable that in addition to having sufficient area reduction properties when exposed to temperatures on the order of below about 212° F., such films should also possess sufficient shrink force shrink energy at such temperatures in order to insure that sufficient force will be inherent in the film to overcome the resisting frictional forces offered by the object which is being wrapped. This shrink force may be defined as the force of contraction at a given temperature when the material is restrained, and more specifically, as the measurable tension produced in a fully mono-directional restrained strip of film when heated to the specified temperature. Films produced for shrink film packaging applications should desirably have a shrink force of at least 100 p.s.i. and for some applications preferably much higher.

It has been found that a thermoplastic film-forming composition made by blending certain amounts of an ethylene-butene-1 copolymer resin of specified properties with polypropylene resin may be extruded into film which exhibits greatly improved shrink properties. Optimum shrink properties of such films are achieved by orientation of the film webs subsequent to extrusion thereof.

In particular the present invention comprises (A) blending (1) from about 10% to about 90% by weight of a high isotactic content polypropylene resin having a melt index at 230° C. of about 0.1 to about 5.0 with (2) from about 10% to about 90% by weight of an ethylene-butene-1 copolymer resin containing less than about 10% by weight of ethylene and having a tensile modulus of at least 5,000 p.s.i. (ASTM test D-638), preferably not more than about 20,000 p.s.i., and still more preferably in the range of 9,000 to 15,000 p.s.i.; and (B) extruding the blend composition to form a base film which upon orientation forms a shrink film product of good optical properties, having excellent shrink film characteristics such as high shrink energy, high area reduction ratios when exposed to elevated temperatures, and highly resistant to blocking.

More particularly, the present invention is carried out with use of such an ethylene-butene-1 copolymer having a melt index of from about 0.1 to about 5.0 and a methylene absorption value of from about 0.001 to about 0.04, i.e. absorbence units/mil at a wave number of 720, a DTA thermal peak value of at least 80° C. and in the range of 80° C. to 130° C. As used herein, DTA designates differential thermal analysis carried out by heating at a rate of rise of 5° C./minute.

In one of the embodiments of the present invention, shrink films possessing the aforediscussed desirable properties are prepared by (A) blending together (1) less than about 50% by weight and preferably about 15 to about 45% by weight of polypropylene having a melt index at 230° C. of from about 0.1 to about 0.3 and preferably about 0.2, and (2) more than about 50% by weight, and preferably about 55 to 85% by weight, of an ethylene-butene-1 copolymer resin, as aforedescribed, containing less than about 10% by weight of ethylene and preferably from about 3 to about 6% by weight of ethylene, which copolymer exhibits a melt index at 190° C. of about 0.2 to 1.0; and (B) extruding the blend composition to form a base film which upon orientation thereof exhibits area reduction ratios of over 2:1 and shrink energies of over 200 p.s.i. when exposed to temperatures below 212° F.

Shrink films currently available include irradiated shrink films made from polyolefins such as irradiated polyethylene, and non-irradiated polyolefins such as polypropylene. When such films are produced from irradiated polyethylene, the polyethylene is essentially extruded, irradiated, heated to melt the crystals, and blown or stretched out to biaxially orient the structure. The resulting film is cooled so that crystallization may take place to stabilize the film in the stressed condition. A particular disadvantage with this type of shrink film, apart from the expense involved in the irradiation treatment is that the irradiated material having been cross-linked is no longer thermoplastic and, hence, is not reusable in scrap reclaim operations. As to non-irradiated polypropylene, it requires exceptionally high shrink temperatures and is shrinkable only in a narrow temperature range.

U.S. Pat. No. 3,372,049 discloses the employment of blends of polypropylene and polybutene homopolymers in the formation of biaxially oriented film products. To the best of our knowledge, employment of homopolymers of butene to produce films from blends thereof with polypropylene results in oriented film products which are generally characterized by having a relatively high degree of haze which makes such films obviously unsuitable for the merchandizing of certain products encased in such hazy film materials. Conversely, the ethylene-butene copolymer and polypropylene blends of the present invention result in biaxially oriented films which exhibit extremely low haze values, i.e. have excellent transparency, whereby the problems encountered with haziness of such prior art film products fabricated from polybutene homopolymer blends are obviated.

British Pat. No. 1,020,012 discloses blend compositions comprising isotactic polypropylene and, for example, copolymers of ethylene and butene-1. The copolymer component of such compositions, however, as disclosed in the British patent are predominantly amorphous copolymers and, further, such copolymers contain in excess of 10% by weight of ethylene which, for reasons as hereinafter discussed, makes films produced from such resin blend compositions undesirable for packaging applications.

As aforesaid, the blend compositions of the present invention provide shrink film products which exhibit desirable high area reduction ratios and high shrink energies when exposed to temperatures on the order of less than 212° F. This is accomplished by blending the relatively low melting point copolymer with the relatively high melting point homopolymer, such as polypropylene for example.

The orientation step is conducted at a temperature above the melting point of the low melt copolymer and below the melting temperature of the higher melting homopolymer. Although it is not intended to be bound by any theory as to the reason underlying the improved results obtained by practice of this invention, it is believed that practice of such an orientation operation with the blends embodied herein allows the higher melting homopolymer, which retains its crystalline state during orientation, to form a reinforcing matrix throughout the melted copolymer phase during the stretching operation.

The compatibility of components of the blend embodied herein is such that, upon cooling from the melt, the crystalline size of each component is so small as to not appreciably interfere with the passage of light. Upon orientation, this results in a film of improved optical properties with retention of the desirable two peak melting curves permitting in use a low temperature melt out of the copolymer component to release the constraint imparted during orientation.

When blends of polypropylene and ethylene-butene-1 copolymer material are employed, as embodied herein, to produce films which are suitable for fabrication into shrink films employing a biaxial orientation forming process, the resultant films possess physical properties which make them ideally suitable for shrink film packaging materials; and more notably such films are characterized in possessing exceptionally high shrink force or contractile energy at relatively low temperatures as well as extremely high area reduction ratios as compared to certain commercially available shrink film materials. For example, oriented films produced from the blended resin composition of the present invention have been found to possess a considerably higher shrinkage capacity in water at 212° F., and below as compared to oriented films of polypropylene which normally require temperatures as high as 330° F. to effect adequate shrinkage. Furthermore, the oriented films produced from the novel blends of the present invention when employing blends in excess of 50% by weight of polypropylene, have been found to possess exceptionally high shrink energies at relatively low temperatures, for example, on the order of about 300 p.s.i., as measured on an Instron Tensiometer, at 212° F. as compared to films fabricated from blends containing less than 50% by weight ethylene-butene-1 copolymers which exhibit substantially lower shrink energies at 212° F. Further advantages resulting from the use of films embodied herein is that being based on thermoplastic materials that do not require extraneous treatment such as irradiation, they can be utilized and reclaimed in commercial operations and, as compared to vinyl films, a substantially larger yield of film area is provided per pound of resin.

The ethylene-butene-1 copolymer, which may be used in the fabrication of shrink film compositions of this invention are copolymers of ethylene and butene-1 containing from about 1 to less than 10 weight percent ethylene. Based on analysis of crystalline morphology, the copolymer is one containing lengthy sequences of butene-1 units in isotactic configuration followed by random but shorter methylene sequences. Such copolymers may be produced by copolymerizing butene-1 and ethylene in the presence of stereospecific polymerization catalysts. For example, such copolymers may be made by reacting an appropriate mixture of butene-1 and ethylene in the presence of suitable catalysts, such as titanium trichloride with an aluminum compound, typical of which are alkyl aluminum halides such as diethylaluminum chloride. A particularly feasible process for preparing them is described in U.S. Pat. No. 3,629,940 which discloses, for example, liquid phase copolymerization of mixtures of butene-1 and ethylene to produce ethylene-butene copolymers utilizing a catalyst system comprising (A) a compound of a transitional metal of Groups IV–A, V–A, VI–A and VII of the Periodic Arrangement of the Elements wherein the metal is present in a valence state lower than its maximum, and (B) at least one organometallic compound of metals of Groups II and III of the Periodic Arrangement of the Elements. A particularly suitable catalyst comprises diethylaluminum chloride, diethylaluminum iodide and TiCl$_3$, as set forth in U.S. Pat. No. 3,629,940, for liquid phase polymerization of a mixture of ethylene and butene to form a relatively high isotactic copolymer. Such a method was used in preparation of the ethylene-butene copolymers for which data is set forth in columns 1 and 2 of Table III and Example 1 herein. The data in column 3 of Table III was obtained from an ethylene-butene copolymer prepared by use of a catalyst comprising TiCl$_3$ and triethylaluminum, a catalyst system that provided a more amorphous polymer, i.e., low isotactic content.

The polypropylene component of the shrink film compositions in accord with the present invention is highly isotactic polypropylene and, for example, a propylene having a solubility isotactic index of at least 90 as measured in heptane. Such polypropylene is produced, as is well known in the art, by polymerizing propylene in the presence of stereospecific catalyst systems. Such polypropylene homopolymers include those which are formed in the presence of minor amounts of ethylene monomer (i.e., on the order of less than 5% by weight) added to facilitate film-forming techniques and film properties formed from such resins.

Prior to extrusion into a film structure, the polymer and copolymer components of the film composition of the present invention are blended together to form a substantially homogeneous resin mixture. This may be accomplished, for example, by masticating the components on a slightly warm, differential speed, 2-roll mill or in similar polymer blending machinery, such as a Banbury mill. The blend is then extruded into a film utilizing a standard extruder and tubular or flat film die and is subsequently oriented utilizing any one of a number of prior art film orientation techniques as hereinbefore described.

Various gauges of shrink film may be manufactured utilizing the novel resin composition of the present invention and the gauge may generally vary from about 0.10 mil up to about 10 mils and preferably from about 0.5 mil to about 2.0 mils depending to a great extent upon the type of shrink packaging applications for which the film is manufactured.

The following example is set forth to more clearly illustrate the present invention and is not intended to limit the scope thereof.

EXAMPLE 1

A mixture of (a) 35.0% by weight of polpropylene, marketed by Montecatini as Moplen F002, a food grade, high isotactic content resin and having a melt index at 230° C. of 0.2 to 0.3 and (b) 65% by weight of an ethylene-butene-1 copolymer having a melt index at 190° C. of 0.2 to 0.3, a methylene absorption value of .014, an ethylene content of 3 to 6%, and a melting point of 96° C. (Differential Thermogram) was blended utilizing a Banbury mill and subsequently fed into the hopper of a standard, rotating screw, extrusion apparatus which served to further mix and melt the blend. The temperature of the melt within the extruder was maintained at about 450° F. The blend was subsequently extruded in the shape of a tube from a tubular die affixed to the outlet end of the extruder, the die being maintained at a temperature of about 425° F. The tube was quenched to a temperature of about 150° F. which was substantially below the crystalline melting points of the propylene homopolymer (about 330° F.) and ethylene-butene-1 copolymer (about 205° F') components, immediately upon emergence from the die. The extruded tube had an external diameter of about 0.95 inch and a wall thickness of about 50 mils. Upon cooling, the tube was collapsed by a set of nip rollers and passed into a preheat oven wherein it was reheated. The temperature of the preheat oven was maintained at about 415° F. in the entry zone thereof and at approximately 210° F. at the exit zone of the oven with the exiting tube having a surface temperature of about 230° F. The collapsed, heated tube was immediately reinflated with air under pressure which expanded the heated tube by a ratio of about 7:1 in a transverse direction and a substantially similar ratio in the longitudinal direction. The expanded tube was subsequently collapsed by a pair of draw rollers operating at speeds higher than the rotational speed of said nip rollers. The biaxially oriented tube, which had a haze value below 2.0% (Gardner haze value) and a gloss value above 80 (Gardner gloss value), was finally passed to a set of windup rollers.

The following table illustrates the surface area reduction or shrink properties of biaxially oriented films, formed of various blends of ethylene-butene-1 copolymer and polypropylene as embodied herein, produced in accordance with the preceding example.

TABLE I

| Film shrink temperature (° F.) | Film area reduction ratio [1] | | |
|---|---|---|---|
| | Blend A [2] | Blend B [3] | Blend C [4] |
| 167 | 1.8 | 1.4 | 1.2 |
| 185 | 2.2 | 1.8 | 1.4 |
| 203 | 3.3 | 2.0 | 1.6 |
| 221 | 4.1 | 2.7 | 1.8 |
| 239 | 5.1 | 3.2 | 2.0 |

[1] Film area reduction ratio = area of film before heating/area of film after heating.
[2] 65% ethylene-butene-1, 35% polypropylene.
[3] 50% ethylene-butene-1, 50% polypropylene.
[4] 35% ethylene-butene-1, 65% polypropylene.

As is apparent from the foregoing Table I, the amount of film area reduction for the blends of ethylene-butene copolymer and polypropylene increased as the percentage of copolymer present increased.

Table I further illustrates that for the particular copolymer used in the blends, the blend of copolymer and homopolymer shows an increase in film area reduction ratio as the proportion by weight of the copolymer material is increased and, hence, that the relative proportion of the copolymer can be adjusted to achieve desirable film shrink properties at about 200° F. Thus, for example, films fabricated from Blend A in the foregoing table, and which contained a major amount (65% by weight) of the copolymer component present, resulted in area reduction ratios exceeding 2:1 when exposed to temperatures on the order of 200° F. and an area reduction ratio of over 3:1 at such temperatures. Such high area reduction ratios are exceedingly desirable in certain shrinkable packaging films.

The following Table II illustrates the percent of shrink area reduction exhibited by oriented films fabricated from resin blends of the present invention in accordance with the procedure of Example 1 as compared to certain commercially available biaxially oriented shrink films when exposed to various shrinking temperatures.

TABLE II

| Film shrink temperature (° F.) | Percent of film shrinkage | | | | | |
|---|---|---|---|---|---|---|
| | Blend A[1] (weight percent) | Cross-linked polyethylene | Rubber hydro-chloride | Poly-vinyl-chloride | Poly-propylene | Polyethylene terephthalate |
| 170 | 45 | 10 | 30 | 35 | 0.00 | 15 |
| 190 | 60 | 25 | 39 | 45 | 0.00 | 25 |
| 212 | 70 | 60 | 45 | 50 | 4 | 33 |
| 230 | 78 | 75 | 52 | 60 | 7 | 35 |

[1] 65% ethylene-butene-1, 35% polypropylene.

Thus from Table II it can be seen that oriented films fabricated from an embodiment of the resin blend composition of the present invention exhibited a high percentage of shrink area reduction at temperature up to 212° F. which is especially desirable when techniques utilizing boiling water to effect film shrinkage are employed.

In addition to possessing a high shrink ratio at temperatures on the order of 212° F., Blend A also possesses a relatively high shrink force at this temperature. As noted above, for certain shrink film applications, it is highly desirable that the films employed possess in addition to a high ratio of film area reduction, i.e. on the order of at least 3:1, a shrink force sufficient so that the film which is wrapped around an object and exposed to heat will have sufficient force to overcome resistance which the film encased object may offer to the area reduction of the film. In other words, the film should exhibit contractive force such that the resultant package will be free of wrinkles and distortions when the shrinking process has been completed. Blends as embodied herein comprising more than about 50% and up to about 80%, preferably about 65% of ethylene-butene-1, and at least about 20%, and preferably about 35%, of polypropylene result upon fabrication in an oriented film that exhibits shrink forces on the order of 300 p.s.i. when exposed to temperatures on the order of 190 to 212° F. Thus, a film which is ideally suited for certain shrink packaging applications, that is, one which has a shrink area reduction ratio of about 3:1 and high shrink force energy on the order of about 300 p.s.i. at temperatures of about 190° to about 212° F. may be produced utilizing resin blend compositions of the present invention.

In further illustration, the following Table III sets forth data for several ethylene-butene copolymers, usable for practice of this invention as a component of blends with polypropylene, along with data for several ethylene-butene copolymers which, in blends with polypropylene, do not provide film-forming resins which produce shrinkable films having the desired properties of the shrinkable films provided by use of polypropylene blended with the ethylene-butene copolymers as embodied in the present invention.

In Table III, column 1 and column 2 show data for copolymers of ethylene-butene in which the ethylene content is less than 10%, i.e. specifically about 5–6% ethylene by weight. Further, these copolymers are characterized by having a high isotactic index (high stereoregularity) as is apparent from the high values for tensile modulus set forth. For the data shown for tensile yield, tensile break, tensile modulus and percent elongation, such data was obtained by use of plaques formed from the copolymers.

The data set forth in Table III, columns 3 and 4, relate to copolymers of ethylene-butene that are either too high in ethylene content (i.e., 10% or more by weight of ethylene) or possess an undesirably low isotactic index (low stereoregularity) as is also apparent from their low tensile modulus whereby they produce, in blends with polypropylene, films that do not possess the desirable properties of the shrink films attained by use of polypropylene blends with ethylene-butene copolymers as embodied herein.

For the data shown in the bottom portion of Table III, relating to properties of films produced from 50% polypropylene–50% ethylene-butene copolymer blends, the films were prepared by the double-bubble method of Example 1 to provide a biaxially oriented film with simultaneous biaxial orientation being carried out at the temperature and stretch ratios shown in the table. The polypropylene resin used in the examples illustrated in Table III, is identified by the supplier as Enjay E6/2, a food grade, high isotactic content resin and having a melt flow at 230° C. of 0.4 to 0.7. The films were prepared from the aforesaid resin blend compounded with 0.25% of a conventional antioxidant (Irganox 1010) and 0.25% by weight of a conventional anti-block agent (erucamide).

In the following Table III, the test procedures employed to determine physical property data of the resins and films are as follows.

| Property: | ASTM test designation |
|---|---|
| Tensile properties (resin) | D-638 |
| Tensile properties (film) | D-882 |
| Percent elongation | D-882 |
| Haze | D-1003 |
| Gloss | D-2457-65T |
| Blocking force | D-1893 |
| Density | D-1505 |
| Melt index | D-1238 |

TABLE III (E–B = ethylene-butene)

| | E–B copolymer [1] | E–B copolymer [1] | E–B copolymer [2] | E–B copolymer [1] |
|---|---|---|---|---|
| Wt. percent of ethylene (determined by infrared analysis) | 5.1 | 5.7 | 5.4 | 10.5 |
| Melt index | 0.22 | 0.56 | 1.37 | 1.07 |
| Tensile yield | 960 | 972 | 309 | 393 |
| Tensile yield at break | 4,000 | 3,676.7 | 1,450 | 1,570 |
| Tensile modulus (p.s.i.) | 14,800 | 14,733 | 3,110 | 4,305 |
| Percent elongation | 498 | 402 | 402 | 466 |
| Density (g./cc.) | 0.892 | 0.898 | 0.872 | 0.875 |

| | Oriented shrink film produced from blend of 50% by weight E–B copolymer and 50% by weight polypropylene resin | | | |
|---|---|---|---|---|
| MD stretch | 6.8× | 6.1× | 6.0× | 5.81× |
| TD stretch | 6.0× | 6.0× | 5.5× | 5.5× |
| Orientation temperature,° F. | 305 | 305 | 308 | 320 |
| Percent shrink at 95° C. | 35.4 | 31.7 | 26.8 | 28.9 |
| Tensile modulus (p.s.i.): | | | | |
| MD | 106,700 | 114,200 | 65,000 | 66,100 |
| TD | 102,710 | 102,600 | 86,800 | 80,700 |
| Break strength: | | | | |
| MD | 15,980 | 16,200 | 11,480 | 12,610 |
| TD | 16,160 | 13,450 | 14,900 | 13,220 |
| Percent elongation: | | | | |
| MD | 45 | 49 | 44 | 55 |
| TD | 42 | 43 | 52 | 39 |
| Shrink force at 95° C.: | | | | |
| Orientation: | | | | |
| MD | 342 | 396 | 249 | 251 |
| TD | 464 | 365 | 410 | 417 |
| Contractual: | | | | |
| MD | 161 | 233 | 136 | 153 |
| TD | 132 | 125 | 166 | 163 |
| Haze | 3.5 | 5.4 | 3.1 | 3.3 |
| Gloss: | | | | |
| MD | 77.3 | 74.8 | 81.1 | 78.7 |
| TD | 73.0 | 70.2 | 77.0 | 77.5 |
| Blocking force (g./cm.) | 4.09 | 4.24 | 18.73 | 15.04 |

[1] High isotactic copolymer.
[2] Low isotactic copolymer.

As shown by the data in Table III, the biaxially oriented films produced from the polypropylene/ethylene-butene copolymer blends of columns 1 and 2 possessed, along with other highly desired properties for shrink films, an exceptionally high tensile modulus and low blocking characteristics. On the other hand, the biaxially oriented films produced from the blends of columns 3 and 4 (either too high in ethylene content or having low isotactic index) exhibited undesirably low tensile modulus and markedly higher blocking characteristics.

Additives to impart desired film surface properties may be incorporated into the polymer blend compositions of the present invention, for example, additives which reduce or eliminate the film's tendency to fog with condensed moisture when exposed to moisture emitting commodities such as fresh meats and produce. Also, antistatic additives which reduce the tendency of the film to build up static electricity charges and many others such as anti-cling additives; additives which promote film slip; and additives which reduce the tendency of multiple layers of film to block together may be added to the blend compositions.

Although the present invention has been described with preferred embodiments, it is to be understood that modifications and variations may be resorted to, without departing from the spirit and scope of this invention, as those skilled in the art will readily understand.

What is claimed is:

1. A resinous blend composition consisting essentially of:
   (a) from 10% to about 90% by weight of a high isotactic content polypropylene resin having a melt index at 230° C. of about 0.1 to about 5.0; and
   (b) from 10% to about 90% by weight of a high isotactic content ethylene/butene-1 copolymer resin containing from about 1% to less than 10% by weight ethylene, said copolymer being further characterized by having a tensile modulus of from about 5,000 p.s.i. to about 20,000 p.s.i.

2. The composition of claim 1 wherein said blend consists essentially of:
   (a) about 35% by weight of said polypropylene; and
   (b) about 65% by weight of said ethylene/butene-1 copolymer.

3. The composition of claim 1 wherein said blend consists essentially of:
   (a) about 50% by weight of said polypropylene; and
   (b) about 50% by weight of said ethylene/butene-1 copolymer.

4. A resinous blend composition consisting essentially of:
   (a) about 35% by weight of a high isotactic content polypropylene resin having a melt index at 230° C. of about 0.1 to about 5.0; and
   (b) about 65% by weight of a high isotactic content ethylene/butene-1 copolymer resin containing from about 3% to about 6% by weight ethylene, said copolymer being further characterized by having a tensile modulus of from about 5,000 p.s.i. to about 20,000 p.s.i.

5. A resinous blend composition consisting essentially of:
   (a) about 50% by weight of a high isotactic content polypropylene resin having a melt index at 230° C. of about 0.1 to about 5.0; and
   (b) about 50% by weight of a high isotactic content ethylene/butene-1 copolymer resin containing from about 3% to about 6% by weight ethylene, said copolymer being further characterized by having a tensile modulus of from about 5,000 p.s.i. to about 20,000 p.s.i.

References Cited

UNITED STATES PATENTS

| 3,372,049 | 3/1968 | Schaffhausen | 117—7 |
| 3,440,208 | 4/1969 | Foglia et al. | 260—41 |

FOREIGN PATENTS

| 1,020,012 | 2/1966 | Great Britain | 260—897 |
| 835,330 | 5/1960 | Great Britain | 260—897 |

MURRAY TILLMAN, Primary Examiner

C. J. SECCURO, Assistant Examiner

U.S. Cl. X.R.

264—210 R, 289, 290 R